Figure 1:
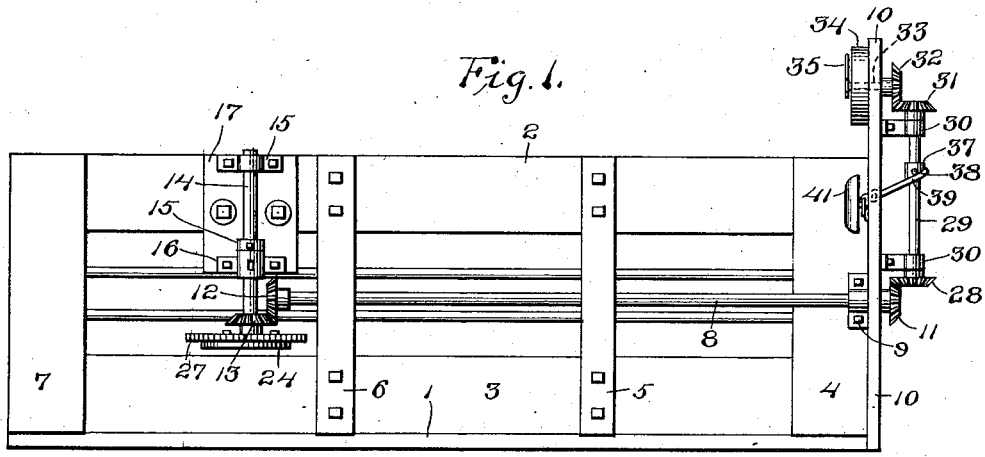

J. I. MAWHINNEY.
ANNUNCIATOR FOR BALING MACHINES.
APPLICATION FILED NOV. 23, 1910.

1,010,163.

Patented Nov. 28, 1911.

WITNESSES

INVENTOR
J. I. Mawhinney
By
Attorneys

UNITED STATES PATENT OFFICE.

JAMES IRVIN MAWHINNEY, OF BOYCE, PENNSYLVANIA.

ANNUNCIATOR FOR BALING-MACHINES.

1,010,163.    Specification of Letters Patent.    Patented Nov. 28, 1911.

Application filed November 23, 1910. Serial No. 593,964.

*To all whom it may concern:*

Be it known that I, JAMES IRVIN MAW-HINNEY, a citizen of the United States of America, residing at Boyce, in the county of Allegheny and State of Pennsylvania, have invented certain new and useful Improvements in Annunciators for Baling-Machines, of which the following is a specification, reference being had therein to the accompanying drawing.

This invention relates to annunciators for baling machines, and the primary object of the invention is the provision of means in a manner as will be hereinafter set forth for producing an audible signal for the operator of the baling machine, whereby the operator will be aware that a certain amount of material, as hay, straw, excelsior or other balable material has passed through the machine, thereby allowing the operator to correctly position the baling blocks for another quantity of material.

Another object of the invention is to furnish a baling machine with an indicator that can be observed by the operator of the machine to ascertain when a predetermined quantity of hay or other material has been baled.

A further object of the invention is to accomplish the above results by a mechanism that is simple in construction, durable, positive in its operation, applicable to various types of baling machines, and highly efficient for the purposes for which it is intended.

These and such other objects as may hereinafter appear are attained by the novel construction, combination and arrangement of parts to be specifically described and then claimed, and reference will now be had to the drawing wherein there is illustrated a preferred embodiment of the invention, but it is to be understood that the structural elements thereof are susceptible to such changes as fall within the scope of the appended claim.

Figure 2:
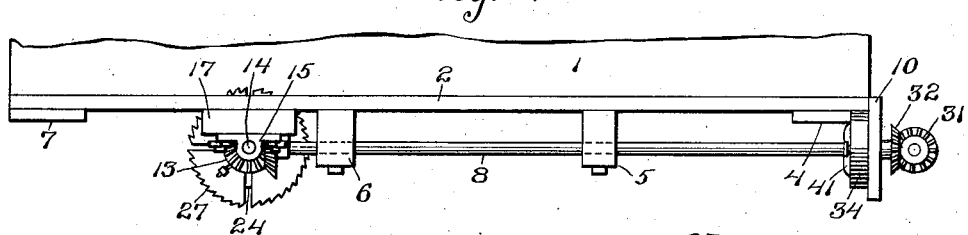
Figure 3:
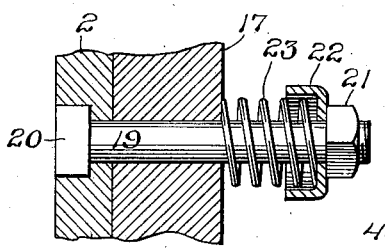
Figure 4:
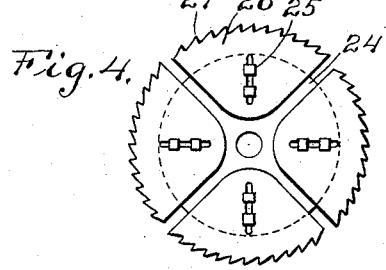
Figure 5:
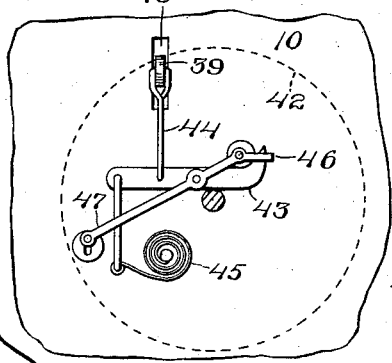
Figure 6:

In the drawing:—Figure 1 is a side elevation of a portion of a baling machine provided with the annunciator, Fig. 2 is a plan of the same, Fig. 3 is a longitudinal sectional view of one of the yieldable supports of the annunciator, Fig. 4 is an enlarged plan of a detached actuating wheel, Fig. 5 is an elevation of the alarm or audible signal, and Fig. 6 is an enlarged front elevation of a dial forming part of the annunciator.

The reference numeral 1 denotes the base of a baling machine having a side wall composed of longitudinal frames 2 and 3 and vertical frames 4, 5, 6 and 7 supporting the longitudinal frames 2 and 3.

Journaled in the vertical frames 5 and 6 is a longitudinal shaft 8 having one end thereof extending through a bearing 9, carried by the frame 4, the same end of the shaft extending through a standard 10 supported by the edge of the frame 4. The ends of the shaft 8 are provided with beveled gear wheels 11 and 12, the latter meshing with a beveled gear wheel 13 mounted upon a vertical shaft 14 journaled in bearings 15 and 16, carried by a yieldable support 17. The shaft 14 is retained in engagement with said bearings by a collar 15 mounted upon the shaft 14 and engaging the top of the bearing 16. The yieldable support 17 is connected to the longitudinal frame 2 by bolts 19 having the heads 20 thereof countersunk in the frame 2, and located upon each bolt adjacent to the nut 21 is a cup 22 housing the outer convolution of a compression spring 23 encircling the bolt 19 between the support 17 and the cup 22.

The lower end of the shaft 14 is provided with an actuating wheel, comprising a circular head 24 to which is connected by a plurality of screw bolts 25 a plurality of segment-shaped blades 26, said blades having the outer edges thereof toothed or serrated, as at 27 to contact with the material being baled by the machine.

The beveled gear wheel 11 of the shaft 8 meshes with a beveled gear wheel 28 mounted upon the lower end of a vertical shaft 29, journaled in bearings 30, carried by the outer side of the standard 10. The upper end of the shaft 29 is provided with a beveled gear wheel 31 meshing with a beveled gear wheel 32 mounted upon the end of a shaft 33, journaled in the upper end of the standard 10, said shaft extending through a dial casing 34 and having the end thereof provided with an indicator 35. The dial of the casing 34 is graduated, as at 36 for a purpose that will presently appear.

Mounted upon the vertical shaft 29 is a collar 37 having a radially disposed pin or cam 38 adapted to engage the end of a lever 39 fulcrumed in a slot 40 provided therefor in the standard 10. A bell 41 is supported by the front side of the standard and in connection with this bell a suitable clapper mechanism 42 is employed, such as a pivoted lever 43 connected to the inner end of the lever 39 by a link 44 and to a retractile spring 45, the lever 43 being arranged to engage the short arm 46 of a clapper 47.

As the baling material engages the actuating wheel, said wheel is rotated and through the medium of the shaft 14, beveled gear wheels 13 and 12, a rotary movement is imparted to the shaft 8, which through the medium of the beveled gear wheels 11 and 28, shaft 29, beveled gear wheels 31 and 32, the indicator 35 is caused to swing in front of the dial casing 34. When the shaft 29 makes one revolution, the bell 41 is sounded thereby attracting the operator's attention to the machine, allowing the operator to observe the movement of the indicator 35, and as this indicator registers with the graduations 36, the operator is aware that the baling blocks must be placed in position. It is during the interval between the graduations 36 that the material has been baled and a bale of the proper dimensions and weight obtained.

The yieldable support 17 permits of the actuating wheel shifting outwardly should any indurate matter be encountered in the baling material. It is through the medium of the adjustable segment-shaped toothed blades that the actuating wheel can be adjusted to positively engage the baling material, and since the blades are detachable they can be easily renewed.

The invention is not limited to the type of alarm employed or to the indicator used in connection with the machine.

What I claim is:—

In an annunciator for baling machines, a baling press, visual and audible annunciating means spaced from and in advance of the feed opening of the press and adapted to be actuated by a rotating element, and means actuated by the movement of the material through the machine for rotating said element, said means comprising a rearwardly extending shaft located at the side of the machine, a vertically-extending shaft at the side of the machine and geared to said rearwardly extending shaft, said vertical shaft carrying and forming the axis of a wheel adapted to be actuated by the moving material, said actuating wheel, and a support carrying the bearings for said vertical shaft, said support being yieldably connected to the side of the machine, the movements of said support permitting yieldable movements of the actuating wheel without disengaging the geared relationship between said shafts.

In testimony whereof I affix my signature in the presence of two witnesses.

JAMES IRVIN MAWHINNEY.

Witnesses:
KARL HOFFMAN BUTLER,
CHRISTINA T. HOOD.

---

Copies of this patent may be obtained for five cents each, by addressing the "Commissioner of Patents, Washington, D. C."